United States Patent [19]

Stanfield

[11] Patent Number: 5,371,340

[45] Date of Patent: Dec. 6, 1994

[54] LOW ENERGY ANIMAL HEATING PAD WITH DIRECTIONAL HEAT TRANSFER

[76] Inventor: Phillip W. Stanfield, 229 S. Locust St., Osborne, Kans. 67473

[21] Appl. No.: 963,721

[22] Filed: Oct. 20, 1992

[51] Int. Cl.⁵ .................. A01K 1/035; H05B 3/00; H05B 1/02
[52] U.S. Cl. ................................. 219/217; 5/421; 119/28.5; 119/33; 219/213; 219/528; 219/548; 392/435
[58] Field of Search ............... 219/528, 548, 549, 217, 219/213, 464, 521; 392/435–437; 119/1, 33, 19, 28.5; 5/421, 422, 423, 451

[56] References Cited

U.S. PATENT DOCUMENTS

| | | | |
|---|---|---|---|
| 1,509,561 | 9/1924 | Lothamer | 219/213 X |
| 2,280,779 | 4/1942 | Barragy | 119/33 |
| 2,512,875 | 6/1950 | Reynolds | 392/435 |
| 2,612,585 | 9/1952 | McCann | 392/435 |
| 2,617,005 | 11/1952 | Jurgensen | 119/28.5 |
| 2,842,651 | 7/1958 | Neely | 219/217 |
| 2,851,992 | 9/1958 | Wolf | 392/435 X |
| 2,963,565 | 12/1960 | Moore et al. | 392/435 X |
| 2,980,058 | 4/1961 | Hoffman | 219/217 X |
| 3,041,441 | 6/1962 | Elbert et al. | 392/435 |
| 3,591,753 | 7/1971 | Gartner | 392/432 X |
| 3,961,157 | 6/1976 | Miller et al. | 219/213 X |
| 4,013,873 | 3/1977 | Olson | 119/33 X |
| 4,332,214 | 6/1982 | Cunningham | 119/33 |
| 4,591,694 | 5/1986 | Phillips | 219/217 |

OTHER PUBLICATIONS

Brochure "Farrowing Heating Pad" Osborne Industries, Inc. Osborne, Kansas.

*Primary Examiner*—Anthony Bartis

[57] ABSTRACT

A heating pad for pets and livestock that includes a plastic surface and an envelope containing a reflective insulation upon which is mounted an electric heating circuit. The reflective insulation includes layers of foil and bubble insulation to store, distribute and direct the heat upward towards the animal while reducing heat loss through the ground or mounting surface. A temperature sensitive switch is provided to conserve energy by permitting power flow between maximum and minimum temperatures, while a lamp is provided to indicate when the unit is drawing energy. The disclosure includes a modification to permit the unit to be used as a fluid storage and warming shelf.

5 Claims, 1 Drawing Sheet

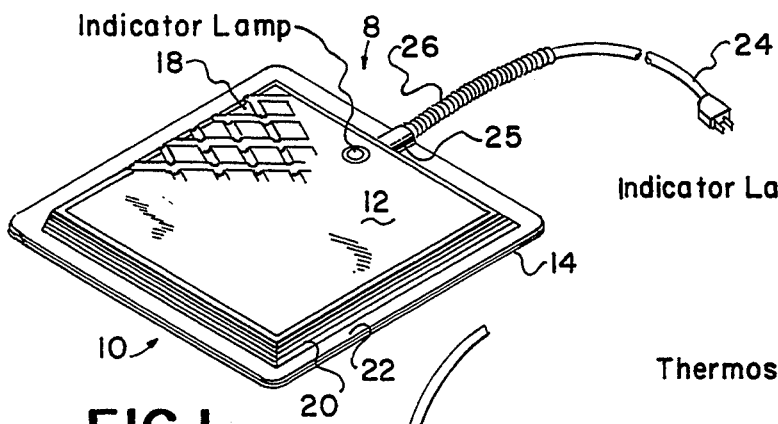
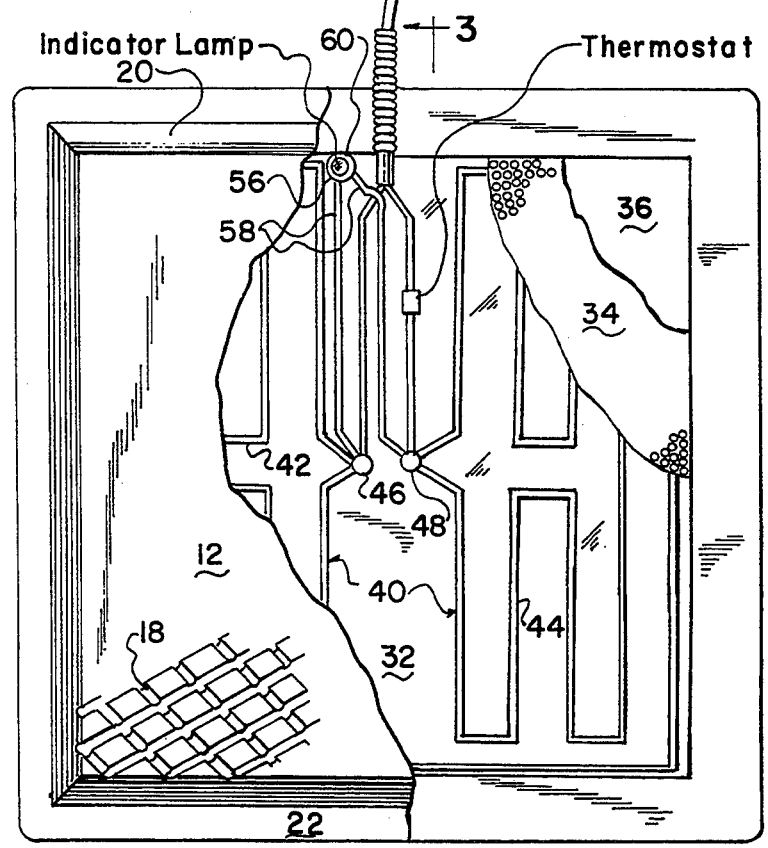
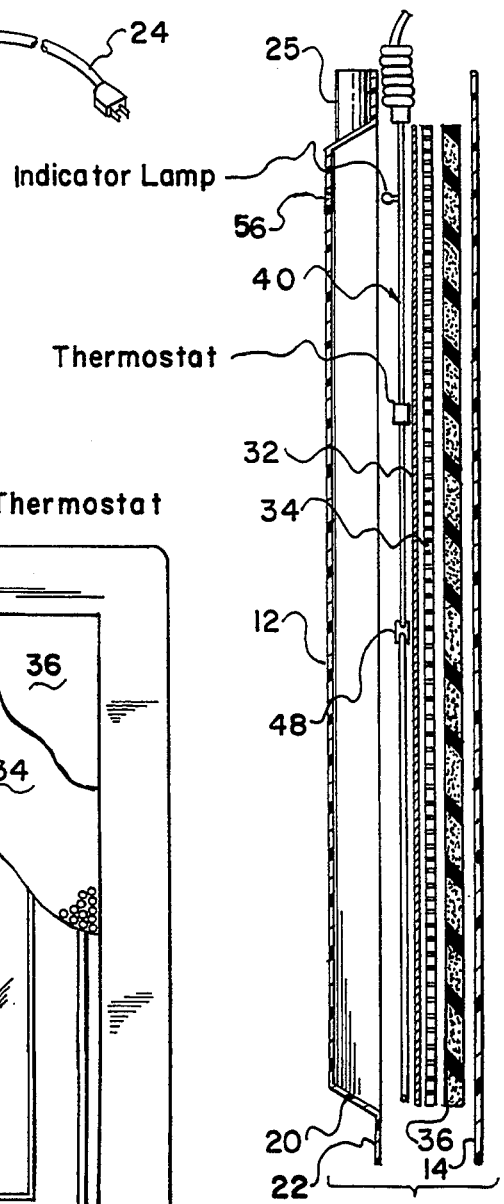
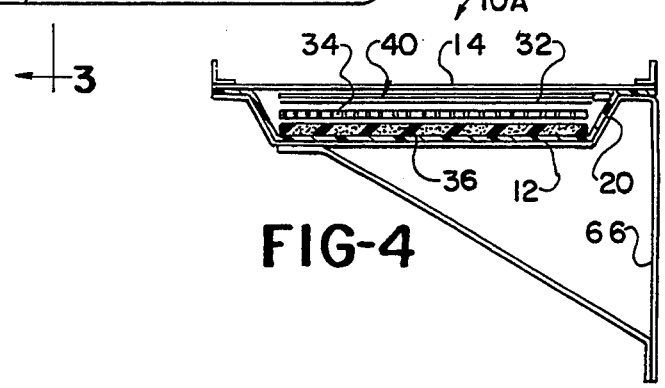

LOW ENERGY ANIMAL HEATING PAD WITH DIRECTIONAL HEAT TRANSFER

BACKGROUND OF INVENTION

1. Field of Invention

This invention relates to a heating device. It has a primary use of providing supplemental heat to livestock and pets. Alternatively, the invention also relates to a heated storage shelf for the storage of paints and other liquids in shop areas to eliminate the necessity to heat the entire storage area during cold weather.

The livestock industry has long been faced with the problem of providing inexpensive supplemental heat to their new born animals. This problem is particularly severe in hog industry in which the sow's body temperature is relatively high and pigs are farrowed into a cold temperature. Their wet skin together with the substantial change in their environment often causes shock and a high death loss. To limit shock and the death loss, hog farmers have long provided supplemental heat to new born pigs. Originally, this supplemental heat was provided by heat lamps which used excessive electrical energy, heated the entire environment, and did nothing to preclude the concrete floors of farrowing barns from conducting the heat away from the pigs. In addition, craftsman using adhesives, paints and other liquids have faced the problem of having these liquids freeze when stored in unheated shops in the wintertime. To avoid this problem, the entire shop area had to be heated, or alternatively, the liquids had to be moved to a warm environment.

2. Related Art

In the 1970's, applicant invented the first commercially successful heating pad for the hog industry. This invention was licensed to Osborne Industries, Inc. of Osborne, Kans. These heating pads became widely known as the STANFIELD TM heat pads. They comprised a fibre glass mat on which was placed a heating wire in a serpentine pattern with the entire unit being bonded into an integral unit by thermosetting resins which were either sprayed or injected into an expensive mold cavity. Such heat pads made according to my prior invention are depicted in sales brochures of Osborne Industries, Inc., a copy of which is included in my disclosure statement and are incorporated herein by reference.

The original STANFIELD TM heat pads were and continue to be an acceptable product. However, they are costly to manufacture, impose high purchase, high operating costs, and can be improved through a better component design, shape and surface pattern which drains water, urine and other liquids from the surface.

SUMMARY OF INVENTION

My invention is a low energy, relatively rigid heating pad. It includes a shell or envelope formed of a non-porous material that does not harbor bacteria. Within the shell is a reflective, heat distributing surface on which is mounted an electric heating circuit. Preferably, the electric circuit has a temperature control switch which permits the flow of energy only when the pad is below a preset temperature. The reflective surface will distribute and reflect the heat upwardly. In addition, the air space within the shell absorbs heat and acts as a heat storage device or thermal chamber. Below the reflective surface is an insulating unit, preferably formed of at least two layers of a bubble pack insulation material in which the bubbles contain air or other liquids. This insulation material limits downward flow of heat and, in part, acts as a heat storage unit.

Accordingly, the objectives of this invention are to provide, inter alia, 1) an animal heating unit with low operating costs;
2) a thermostat controlled heating pad that limits energy consumption and heat generation to a temperature range designed for each major application;
3) an animal heating unit with a raised surface design that permits drainage of water, urine and other liquids to keep the animals dry and warm;
4) an animal heat unit that does not absorb liquids, is non-porus to bacteria and is easily cleaned;
5) a heating pad that uniformly distributes heat to the upper surface, precludes or limits heat transfer to the lower surface and is capable of storing heat in a thermal chamber to reduce operating costs; and
6) a heating pad that provides a visible indication that it is functioning.

DESCRIPTION OF THE DRAWINGS

The manner in which these objectives and other desirable characteristics can be obtained from my invention is explained in the following specification and attached drawings in which:

FIG. 1 is a perspective view of a preferred embodiment of my invention;

FIG. 2 is a plan view of the preferred embodiment of FIG. 1 of my invention with sections broken away to disclose various layers;

FIG. 3 is a side elevation view taken in section along the lines 3—3 of the preferred embodiment of FIG. 2;

FIG. 4 is a side elevation view of an alternative embodiment of my invention.

DESCRIPTION OF THE PREFERRED EMBODIMENT

The preferred embodiment of my heating pad invention 8 is generally illustrated in FIG. 1 of the drawings. It comprises a hollow envelope or shell 10 formed of a top sheet 12 of molded plastic bonded to a lower sheet 14 around its periphery. The surface 16 of the top sheet 12 is generally flat and has a pattern of grooves 18 formed therein. These groves 18 extend to a downward sloped surface or ramp 20 to drain urine or other liquids from the top surface and off the pad. Connected to and extending around the periphery of the pad top sheet 12 is a flat section or annular periphery 22 whose bottom side serves as a bonding surface for bonding the top sheet 12 to the bottom sheet 14. The bottom sheet 12 is generally flat and acts as a closure for the envelope. Any suitable, waterproof adhesive or other bonding method may be used for bonding the top sheet 12 to the bottom sheet 14. I have found that a glue gun using a hot melt glue stix containing a clear adhesive such as model AP10 from Arrow Corporation obtainable from most hardware stores is acceptable.

The top sheet 12 and the bottom sheet 14 are, preferably formed of an acrylonitrile-budadiene-styrene (ABS) plastic. Alternatively other plastic materials such as polyvinylchloride (PVC), polyarylate, polycarbonate, high density polyethylene (HDPE), acrylic-styrene-acrylonitrile (ASA), polystyrene (PS), styrene-acrylonitrile (SAN), and polyarylsulfone may be used.

A power cord 24 extends from a heating circuit within the envelope through a molded opening 25 in the top sheet for connection to an electrical outlet. Preferably, a coil wire spring 26 is placed over the power cord and extends into the molded opening to reinforce the cord as shown in FIG. 1. A filler-sealant is then used to fill the space around the molded opening to seal this space. Acceptable sealants include silicone or butyl rubber sealants such as that sold by ACE Hardware Stores under ACE product no. 10204.

Prior to forming the envelope 10 and bonding the top sheet 12 to the bottom sheet 14, the internal components of the heating pad are assembled and put into place. These internal components are depicted in FIGS. 2 and 3. They comprise a reflective insulation having a top foil material 32 to reflect heat upward and at least one layer of lower bubble pack insulation 34 to limit heat transfer and loss downwardly through the bottom sheet 14. These materials may be purchased together in a bonded composite sheet or roll. My preference is to use Reflectix TM reflective insulation which is marketed by Reflectix Corporation of Markleville, Ind. This reflective insulation has a total of six layers of material which includes foil, a poly sheet for strength, bubble pack insulation, another poly sheet, another sheet of bubble pack insulation, a third poly sheet and foil. Similar reflective insulations may be obtained from Astro-Foil of Crown Point, Indiana and Energy-Saver Imports of Broomfield Colo.

Mounted on the top foil of the reflective insulation 30-32 an electric heating circuit 40. This circuit is, preferably, formed of a NICHROME heating wire with a silicone coating. My preference is to use Item SW200-GB #1 from Springfield Wire, Inc. 243 Cottage Street, Springfield, Mass. 01101. Depending upon the size of the heating pad and the heat desired, it may be necessary to use wires with other resistances. In addition, a braided fiberglass or braided aluminum wire may be used to provide more mechanical protection.

In the preferred embodiment of FIG. 2, the heating circuit includes two parallel circuits 42 and 44 which are laid out in a generally serpentine pattern as shown and connected at 46 and 48 to the power cord 24.

Interconnected in the power cord line at 50 is a temperature control unit. This unit senses the temperature of the heating pad and, depending upon the temperature, either permits or interrupts current flow. My preference is to use a Thermodisc TM control, type 36T01 manufactured by Therm-O-Disc, Inc of 1320 South Main Street of Mansfield, Ohio 44507. In the preferred embodiment, this unit permits current flow at pad temperatures below 110° F. and interrupts current flow at pad temperatures above 135° F. Depending upon the use of the heating pad, such controls may be obtained to permit or interrupt current flow at other temperatures.

Though unnecessary, I have found it desirable to add an visual device such as an indicator lamp to the heat pad to indicate when it is drawing current and operating. Such is depicted in FIGS. 1 and 2 in which the lamp is show at 54. This lamp may be connected to the circuit through wires 58. A simple, but effective way of installing this lamp is to drill an aperture 56 into the top pad 12, place the lamp 54 just below the aperture 58 and fill the aperture and the space around the lamp with a clear adhesive such as that from the hot melt glue stix mentioned above. The indicator test lamp may be quite small and require the draw of only a few milliamps of current.

In manufacture of the unit, the circuit 40 is placed upon the foil 32 and affixed thereto by a high temperature glass cloth tape that has a thermosetting pressure sensitive adhesive. Such tapes are well known to the industry and are available from companies such as Minnesota Mining and Manufacturing Co. of St. Paul, Minn. Upon affixation of the circuit to the foil 32, this subcombination is then inserted into the upper sheet with the circuit being adjacent the sheet. Preferably there is at least a small clearance between the top sheet 12 and the circuit 40 defining an air space.

Within the shell 10, I also prefer to place a another insulating layer 36 such as a sheet of expanded foam of polystyrene. Alternatively, a second layer of the reflective insulation 32-34 may be used. This additional layer adds another heat barrier to preclude heat transfer to concrete floors upon which most animal heating units will be anchored.

The pad 8 may be anchored by drilling apertures through the annular periphery 22 of the shell 10 and affixing anchoring bolts into the concrete floor.

In operation, the animal heating pad 8 is affixed to the floor of a farrowing barn and, usually within the "crate." The unit is plugged into a power source and the NICHROME wire 40 generates heat until the temperature reaches the preset temperature of the control switch 50 at which time the switch interrupts the power supply to the heating circuit 40. The air space within the envelope 10 together with the reflective insulation 30-32 absorbs heat and slowly gives it up to conserve energy. As soon as the temperature of the pad reaches a minimum level, the switch 50 switches to permit current flow.

FIG. 4 depicts an alternative embodiment and novel use of my invention. This embodiment is essentially a rearrangement of the components of FIGS. 1-3 to obtain a low energy, heated storage shelf. In FIG. 4, the envelope 10A is inverted and the subcombination rearranged so that the electric circuit 40 is adjacent the top layer 14 which, in the prior embodiment was on the bottom. Support brackets 66 are positioned at each end of the heating pad 8 for affixing the unit as a shelf to a shop wall. When so used, my invention will provide a very low cost method of protecting paints, and other liquids from freezing while avoiding heating of the entire storage facility or shop area.

Persons skilled in the art of plastic forming and circuit design will discover that many modifications of my invention will produce satisfactory results. Different plastics may be used. Heating wires of different resistances may be chosen to provide different operating temperatures. Similarly, the temperature control switch may be altered to provide different operating temperatures for the unit. These and other variations, which will be appreciated by those skilled in the art, are within the intended scope of my invention as claimed below.

I claim:

1. A heating device for animals comprising:
   a) a top sheet including a generally flat surface with a downwardly sloped section terminating in a peripheral bonding section, said sheet being formed of a durable non-porous plastic member, said generally flat surface having grooves therein for draining urine and liquids therefrom;
   b) a bottom sheet having a generally flat surface, said top sheet and bottom sheets being bonded together at their periphery to define a hollow shell means for encapsulating a heating system and for providing a thermal chamber for storing heat;

c) a heating system including a reflective insulation means substantially filling said shell means, said reflective insulation having a foil layer arranged to reflect, store and distribute heat to the top sheet of said shell means, and a bubble insulation layer below said foil layer for absorbing and precluding heat flow towards the bottom sheet;

d) an electric heating circuit mounted on said first foil layer receiving electrical energy and converting said energy into heat to be reflected to the top sheet of said case means;

e) connecting means connected to said circuit for connecting said circuit to a source of electric power, f) a thermal responsive switch interconnected between said heating circuit and said connecting means for detecting the temperature above said insulation and for interrupting the delivery of electric power to said circuit when the temperature of said pad reaches a preset maximum; and g) indicating means connected to said circuit for indicating when said heating device is drawing electric power.

2. A heating device comprising:

a) a hollow envelope means formed of a durable non-porous plastic member and having a top and a bottom generally flat surfaces;

b) a generally planar reflective insulation means filling said envelope means, said reflective insulation having a first foil surface arranged to reflect and distribute heat to the top surface of said envelope, and a bubble insulation below said foil surface for absorbing and precluding heat flow towards the bottom surface;

c) a pair of electric heating circuits mounted on said reflective insulation for receiving electrical energy and converting said energy into heat to be reflected to the top surface of said envelope;

d) connecting means connected to said circuits for connecting said circuits to a source of electric power, and e) a thermal responsive switch interconnected between said heating circuits and said attaching means for detecting the temperature above said insulation and for permitting the delivery of electric power to said circuit when said temperature is below a minimum preset minimum.

3. A heating device as recited in claim 2 in said switch permits the permits the flow of electric energy to said circuits only when the temperature above said insulation is between 110° F. and 135° F.

4. A heating device as recited in claim 2 in which the envelope means also contains a further insulating means for limiting heat transfer through the bottom surface of said envelope, said further insulating means being positioned below said reflective insulation means.

5. A heating device as recited in claim 2 in which said envelope includes support means for using said device as a shelved heating tray.

* * * * *